(12) United States Patent
Ota (10) Patent No.: US 8,078,968 B2
(45) Date of Patent: Dec. 13, 2011

(54) PROJECTOR, NON-TRANSITORY STORAGE MEDIUM, COMPUTER PROGRAM PRODUCT AND METHOD

(75) Inventor: Koichiro Ota, Omachi (JP)

(73) Assignee: Seiko Epson Corporation, Tokyo (JP)

( * ) Notice: Subject to any disclaimer, the term of this patent is extended or adjusted under 35 U.S.C. 154(b) by 1134 days.

(21) Appl. No.: 11/896,576

(22) Filed: Sep. 4, 2007

(65) Prior Publication Data

US 2008/0059529 A1    Mar. 6, 2008

(30) Foreign Application Priority Data

Sep. 4, 2006  (JP) ................ 2006-238749

(51) Int. Cl.
*G06F 17/00* (2006.01)

(52) U.S. Cl. ........ 715/730; 715/756; 715/202; 709/246; 709/223

(58) Field of Classification Search .......... 715/730, 715/234, 273, 750; 353/30
See application file for complete search history.

(56) References Cited

U.S. PATENT DOCUMENTS

| 5,629,714 | A | 5/1997 | Nishitani et al. | |
|---|---|---|---|---|
| 6,735,616 | B1 * | 5/2004 | Thompson et al. | 709/204 |
| 7,552,228 | B2 * | 6/2009 | Parasnis et al. | 709/231 |
| 2003/0117532 | A1 * | 6/2003 | Karasawa et al. | 348/734 |
| 2006/0050240 | A1 * | 3/2006 | Castaldi et al. | 353/30 |

FOREIGN PATENT DOCUMENTS

| JP | A-04-273651 | 9/1992 |
|---|---|---|
| JP | A-2002-247539 | 8/2002 |
| JP | A-2003-006128 | 1/2003 |

* cited by examiner

*Primary Examiner* — Quoc A. Tran
(74) *Attorney, Agent, or Firm* — Oliff & Berridge, PLC (57) ABSTRACT

A projector including: a communication section; a storage section which stores initial projection target data, updated projection target data, layout data and others; an update request reception section which receives an update request from PC via the communication section, and sequentially writes update request data indicating details of the update request into the storage section; an update section which updates the updated projection target data based on the update request data; a web information generation section which causes the communication section to transmit web information to PC based on the updated projection target data and the layout data; an image generation section which generates an image based on the updated projection target data; and a projection section which projects the image.

9 Claims, 8 Drawing Sheets

| REQUEST ID | EXTERNAL DEVICE ID | POSITION ID | TOPIC | DETAILS | CREATOR | UPDATE TIME |
|---|---|---|---|---|---|---|
| 0001 | PC01 | P001 | PLAN FOR NEXT TERM | INSPECTION OF BUDGET IS REQUIRED | A | 12:05 |
| 0002 | PC02 | P002 | ACQUISITION OF ISO | REVIEWS STANDARD | B | 13:53 |
| 0003 | PC02 | P001 | PLAN FOR NEXT TERM | INSPECTION OF DECIDED BUDGET IS REQUIRED | B | 13:59 |
| 0004 | PC03 | P001 | PLAN FOR NEXT TERM | BUDGET HAS BEEN DECIDED | C | 14:30 |
| 0005 | PC01 | P001 | PLAN FOR NEXT TERM HAS BEEN DETERMINED | BUDGET HAS BEEN DECIDED | A | 14:50 |

| POSITION ID | TOPIC | DETAILS | CREATOR | UPDATE TIME |
|---|---|---|---|---|
| P001 | PLAN FOR NEXT TERM | INSPECTION OF BUDGET IS REQUIRED | A | 12:05 |
| P002 | ACQUISITION OF ISO | REVIEWS STANDARD | B | 13:53 |

| POSITION ID | TOPIC | DETAILS | CREATOR | UPDATE TIME |
|---|---|---|---|---|
| P001 | PLAN FOR NEXT TERM HAS BEEN DETERMINED | BUDGET HAS BEEN DECIDED | A | 14:50 |
| P002 | ACQUISITION OF ISO | REVIEWS STANDARD | B | 13:53 |

```
                                            ┌123
BUSINESS MEETING TOPIC
#{repeat}
{
        #{insert_topic}
        #{insert_details}
        #{insert_creator}
}
```

FIG.7

| EXTERNAL DEVICE ID | AUTHORITY |
|---|---|
| PC01 | UPDATE |
| PC02 | UPDATE |
| PC03 | UPDATE |

| REQUEST ID | EXTERNAL DEVICE ID | POSITION ID | TOPIC | DETAILS | CREATOR | UPDATE TIME |
|---|---|---|---|---|---|---|
| 0001 | PC01 | P001 | PLAN FOR NEXT TERM | INSPECTION OF BUDGET IS REQUIRED | A | 12:05 |
| 0002 | PC02 | P002 | ACQUISITION OF ISO | REVIEWS STANDARD | B | 13:53 |
| 0003 | PC02 | P001 | PLAN FOR NEXT TERM | INSPECTION OF DECIDED BUDGET IS REQUIRED | B | 13:59 |
| 0004 | PC03 | P001 | PLAN FOR NEXT TERM | BUDGET HAS BEEN DECIDED | C | 14:30 |
| 0005 | PC01 | P001 | PLAN FOR NEXT TERM HAS BEEN DETERMINED | BUDGET HAS BEEN DECIDED | A | 14:50 |

BUSINESS MEETING TOPIC

PLAN FOR NEXT TERM HAS BEEN DETERMINED
BUDGET HAS BEEN DECIDED
A

ACQUISITION OF ISO
REVIEWS STANDARD
B

FIG.11

| POSITION ID | TOPIC | DETAILS | CREATOR | UPDATE TIME |
|---|---|---|---|---|
| P001 | PLAN FOR NEXT TERM | INSPECTION OF DECIDED BUDGET IS REQUIRED | B | 13:59 |
| P002 | ACQUISITION OF ISO | REVIEWS STANDARD | B | 13:53 |

FIG.12

```
                                          ┌─ 404
┌─────────────────────────────────────────┐
│ BUSINESS MEETING TOPIC                  │
│                                         │
│ PLAN FOR NEXT TERM                      │
│ INSPECTION OF DECIDED BUDGET IS REQUIRED│
│ B                                       │
│                                         │
│ ACQUISITION OF ISO                      │
│ REVIEWS STANDARD                        │
│ B                                       │
└─────────────────────────────────────────┘
```

PROJECTOR, NON-TRANSITORY STORAGE MEDIUM, COMPUTER PROGRAM PRODUCT AND METHOD

Japanese Patent Application No. 2006-238749, filed on Sep. 4, 2006, is hereby incorporated by reference in its entirety.

BACKGROUND OF THE INVENTION

The present invention relates to a projector having a communication function, an information storage medium, and an image processing method.

Network projectors having a communication function have been put on the market. Specific examples of the communication function include an image transmission function, a remote setting function, and the like. When such a network projector has a server function, the network projector may be able to receive a connection request from another instrument such as a personal computer (PC) connected via a network.

For example, JP-A-2002-247539 discloses a projector having a web server function, wherein the projector transmits an HTML file for inputting the URL of the storage location of electronic data in response to a connection request from another information instrument, and receives the storage location transmitted from the information instrument using an HTTP protocol, or displays a web page on the Internet without using an external PC.

According to the related-art configuration, when the user who operates a PC desires to change data stored in the projector, document data projected by the projector, or the like, the PC must acquire an exclusive update authority. Therefore, when each member participating in a meeting such as a brainstorming session may change the document data or the like, it is difficult to change the stored or projected document data or the like from two or more PCs at the same time.

For example, when the user takes the minutes of a meeting or the like, one user must change the document data or the like. That is, it is difficult for two or more users to change the document data or the like.

In view of the above situation, a projector has been demanded which has a function for more effectively managing a meeting using a projector or the like.

SUMMARY

According to a first aspect of the invention, there is provided a projector comprising: a communication section which communicates with a plurality of external devices; a storage section which stores projection target data and layout data for arranging the projection target data in a web page form; an update request reception section which receives an update request from the external devices via the communication section, and sequentially writes update request data indicating details of the update request into the storage section; an update section which updates the projection target data based on the update request data; a web information generation section which generates web information for displaying the projection target data in the web page form based on the projection target data and the layout data, and causes the communication section to transmit the web information to the external devices; an image generation section which generates an image based on the projection target data; and a projection section which projects the image.

According to a second aspect of the invention, there is provided an information storage medium storing a program readable by a computer included in a projector having a communication section which communicates with a plurality of external devices, a storage section, and a projection section, the program comprising: an instruction for causing the storage section to store projection target data and layout data for arranging the projection target data in a web page form; an instruction for causing the computer to receive an update request from the external devices via the communication section, and sequentially write update request data indicating details of the update request into the storage section; an instruction for causing the computer to update the projection target data based on the update request data; an instruction for causing the computer to generate web information for displaying the projection target data in the web page form based on the projection target data and the layout data, and cause the communication section to transmit the web information to the external devices; an instruction for causing the computer to generate an image based on the projection target data; and an instruction for causing the projection section to project the image.

According to a third aspect of the invention, there is provided a method for controlling a projector having a communication section which communicates with a plurality of external devices, and a storage section which stores projection target data and layout data for arranging the projection target data in a web page form, the method comprising steps of: receiving an update request from the external devices via the communication section; sequentially writing update request data indicating details of the update request into the storage section; updating the projection target data based on the update request data; generating web information for displaying the projection target data in the web page form based on the projection target data and the layout data; transmitting the web information to the external devices from the communication section; and generating and projecting an image based on the projection target data.

DETAILED DESCRIPTION OF THE EMBODIMENT

The invention may provide a projector, an information storage medium, and an image processing method capable of more flexibly updating projection target data stored in the projector. In particular, the invention may provide a projector, an information storage medium, and an image processing method allowing two or more users to simultaneously update projection target data stored in the projector.

According to one embodiment of the invention, there is provided a projector comprising: a communication section which communicates with a plurality of external devices; a storage section which stores projection target data and layout data for arranging the projection target data in a web page form; an update request reception section which receives an update request from the external devices via the communication section, and sequentially writes update request data indicating details of the update request into the storage section; an update section which updates the projection target data based on the update request data; a web information generation section which generates web information for displaying the projection target data in the web page form based on the projection target data and the layout data, and causes the communication section to transmit the web information to the external devices; an image generation section which generates an image based on the projection target data; and a projection section which projects the image.

According to one embodiment of the invention, there is provided an information storage medium storing a program readable by a computer included in a projector having a communication section which communicates with a plurality of external devices, a storage section, and a projection section, the program comprising: an instruction for causing the storage section to store projection target data and layout data for arranging the projection target data in a web page form; an instruction for causing the computer to receive an update request from the external devices via the communication section, and sequentially write update request data indicating details of the update request into the storage section; an instruction for causing the computer to update the projection target data based on the update request data; an instruction for causing the computer to generate web information for displaying the projection target data in the web page form based on the projection target data and the layout data, and cause the communication section to transmit the web information to the external devices; an instruction for causing the computer to generate an image based on the projection target data; and an instruction for causing the projection section to project the image.

According to one embodiment of the invention, there is provided a method for controlling a projector having a communication section which communicates with a plurality of external devices, and a storage section which stores projection target data and layout data for arranging the projection target data in a web page form, the method comprising steps of: receiving an update request from the external devices via the communication section; sequentially writing update request data indicating details of the update request into the storage section; updating the projection target data based on the update request data; generating web information for displaying the projection target data in the web page form based on the projection target data and the layout data; transmitting the web information to the external devices from the communication section; and generating and projecting an image based on the projection target data.

According to the above embodiments, since the projector and the like update the projection target data after sequentially writing the update request data into the storage section, a wait time does not occur, differing from the case where the projector and the like update the projection target data while occupying the projection target data. Therefore, two or more users can simultaneously update the projection target data stored in the projector, whereby the projection target data can be updated more flexibly.

Moreover, each user can immediately confirm the information including the updated information by causing each external device to display the web page showing the projection target data arranged in a desired format based on the layout data and causing the projector to project the image based on the projection target data, whereby a meeting or the like can be held more effectively.

The projection target data may include initial projection target data and updated projection target data indicating the projection target data updated by the update section; the update section may write information indicating an update time in the update request data when the update section updates the projection target data based on the update request; and when the external devices or a remote controller for the projector has issued a rollback request specifying an update time, the update section may generate the updated projection target data of the specified update time based on the update request data having an update time being the same or before the specified update time and the initial projection target data.

According to this feature, when a request (rollback request) for recovering the projection target data at a specific point in time has been issued, the projector and the like can recover the projection target data at the specified point in time in response to the request. Therefore, the projector and the like can more flexibly update the projection target data.

The projection target data may include initial projection target data and updated projection target data indicating the projection target data updated by the update section; the update request may include identification information for identifying an external device in the external devices which has issued the update request or a user of the external device; the update request data may include the identification information; and when the external devices or a remote controller for the projector has issued a display request specifying the identification information, the update section may generate the updated projection target data updated by the external device or a user of the external device corresponding to the specified identification information, based on the update request data having the identification information which coincides with the specified identification information and the initial projection target data.

According to this feature, the projector and the like can flexibly generate the updated projection target data according to the designation of the identification information of the user, and can display the image updated by the external device corresponding to the identification information or the user of the external device.

The storage section may store authorization data indicating at least one of authority of each of the external devices for the projection target data and authority of each user of the external devices for the projection target data; the update request reception section may write at least one of identification information of the external devices which has issued the update request and identification information of a user of the external device into the storage section as part of the update request data; and the update section may update the projection target data based on the update request data and the authorization data when the external device or the user of the external device has update authority for the projection target data, and may not update the projection target data when the external device or the user of the external device does not have the update authority for the projection target data.

According to this feature, the projector and the like can determine whether or not to update the projection target data based on the authority of the external device or the user, whereby the projector and the like can more flexibly update the projection target data.

The projection target data may include a plurality of items; the authorization data may indicate the authority for each of the items; and the update section may update the projection target data based on the update request data and the authorization data when the external devices or a user of the external device has update authority for one of the items in the projection target data for which the update request has been issued, and may not update the projection target data when the external device or the user of the external device does not have the update authority for one of the items in the projection target data for which the update request has been issued.

According to this feature, the projector and the like can determine whether or not to update the projection target data based on the authority for each item in the projection target data, whereby the projector and the like can more flexibly update the projection target data.

The communication section may receive update availability information from a remote controller; and the update section may update the projection target data based on the update availability information and the update request data when the update availability information indicates that the update is allowed, and may not update the projection target data when the update availability information indicates that the update is not allowed.

According to this feature, the projector and the like can determine whether or not to update the projection target data based on the update availability information from the remote controller, whereby the projector and the like can more flexibly update the projection target data.

The invention is described below with reference to the drawings taking the case of applying the invention to a projector. Note that the embodiments described hereunder do not in any way limit the scope of the invention defined by the claims laid out herein. In addition, not all of the elements of the embodiments described below should be taken as essential requirements of the invention.

Entire System

Figure 1:
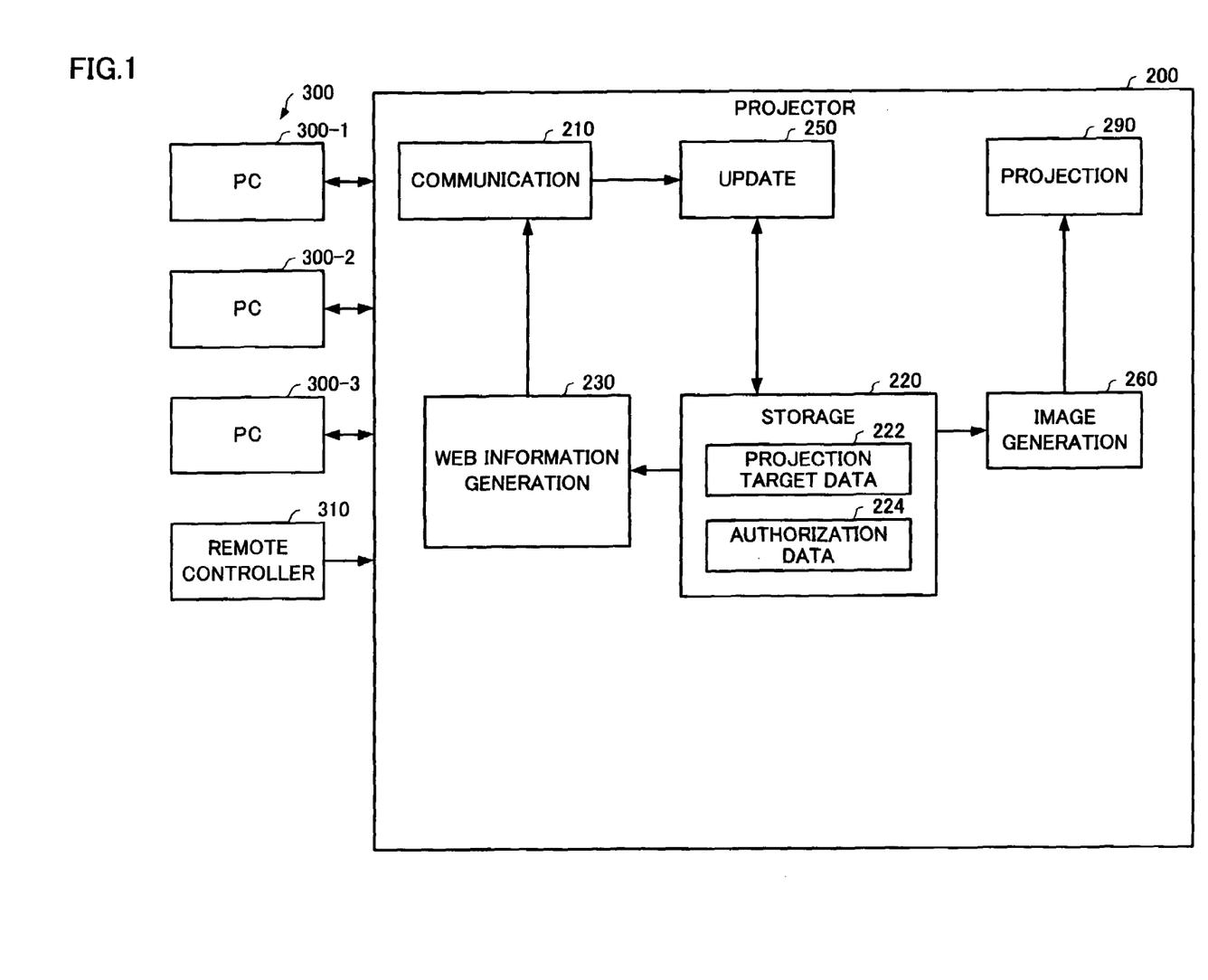
FIG. 1 is a functional block diagram of a related-art projector.

FIG. 1 is a functional block diagram of a related-art projector 200.

For example, two or more PCs 300 are connected with the projector 200 in a meeting room via wireless communication, and the users of the PCs 300 hold a meeting.

The related-art projector 200 is configured to include a communication section 210 which can communicate with a remote controller 310 for the projector 200 and PCs 300-1 to 300-3 (one type of external device), an update section 250, a storage section 220 which stores projection target data 222, authorization data 224, and the like, a web information generation section 230 which generates web information based on the projection target data 222, an image generation section 260 which generates an image based on the projection target data 222, and a projection section 290 which projects the image.

The communication section 210 receives update request data from the PC 300, and transmits the web information to the PC 300.

The PC 300 displays an image in a web format based on the web information. This allows a web image almost the same as the image projected by the projector to be displayed on the screen of the PC 300.

When the projector has received the update request data from the PC 300, the update section 250 occupies (locks in) the projection target data 222 when the PC 300 or the user of the PC 300 has update authority based on the authorization data 224.

When the update section 250 occupies the projection target data 222, the update section 250 does not update the projection target data 222, even if the projector has received update request data from another PC 300 having update authority. The PC 300 which has issued that update request enters a wait state.

According to the related-art file sharing method, a wait time occurs when two or more update requests have been issued for the same data almost at the same time, thereby hindering a flexible update operation.

Figure 2:
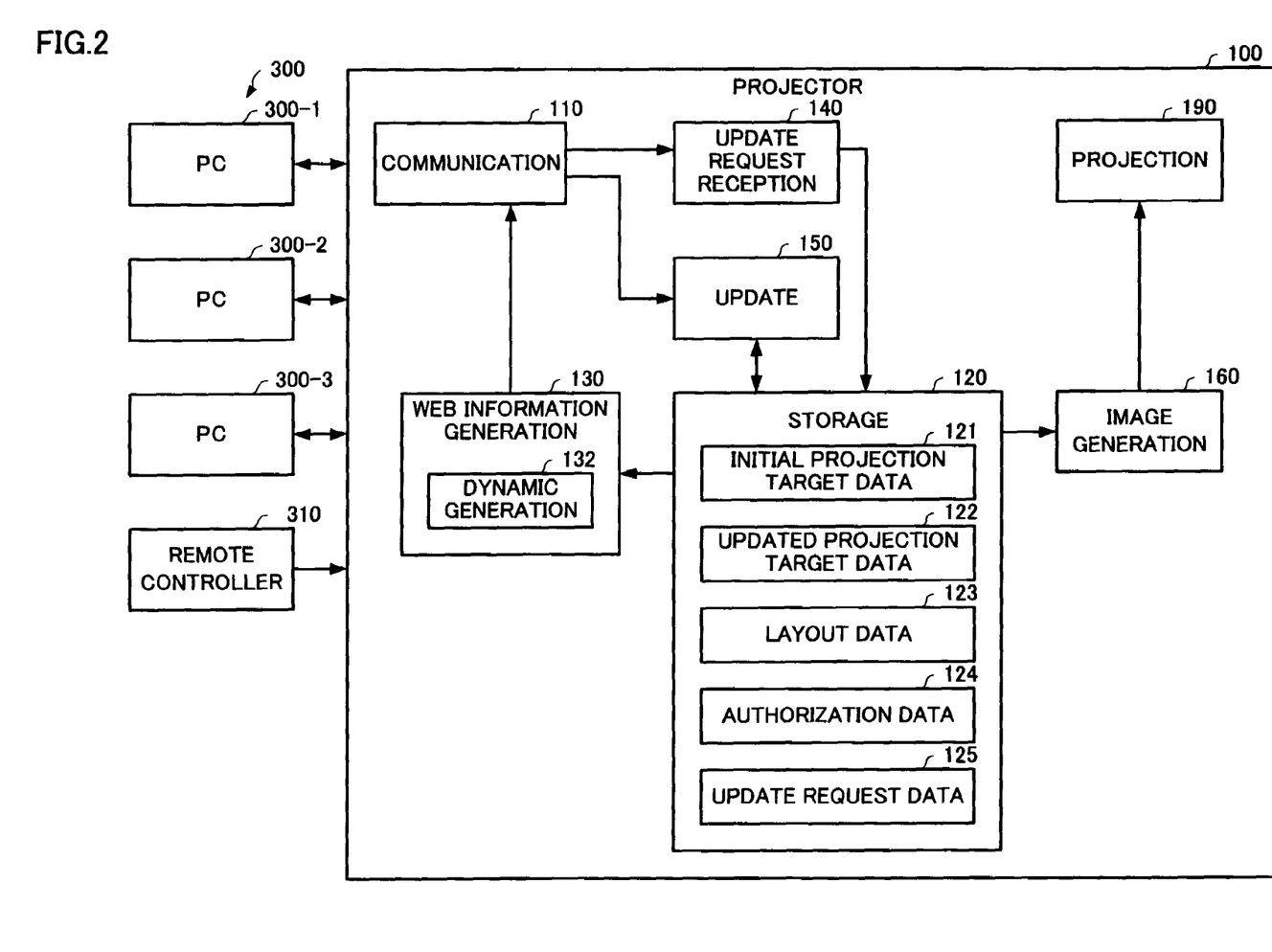
FIG. 2 is a functional block diagram of a projector according to one embodiment of the invention.

FIG. 2 is a functional block diagram of a projector 100 according to one embodiment of the invention.

The projector 100 is configured to include a communication section 110 which can communicate with a remote controller 310 for the projector 100 and PCs 300-1 to 300-3 (one type of external device), a storage section 120, an update request reception section 140 which receives an update request from the PC 300 through the communication section 110 and sequentially writes update request data 125 indicating the details of the update request into the storage section 120, and an update section 150 which updates updated projection target data 122 based on the update request data 125.

The storage section 120 stores initial projection target data 121, updated projection target data 122, layout data 123, authorization data 124, update request data 125, and the like. The details of these pieces of data are described later.

The projector 100 is configured to include a web information generation section 130 which generates web information for displaying the projection target data in a web page form based on the updated projection target data 122 and the layout data 123, and causes the communication section 110 to transmit the web information to the PC 300, an image generation section 160 which generates an image based on the projection target data, and a projection section 190 which projects the image.

The projector 100 also functions as a web server utilizing the functions of the communication section 110, the web information generation section 130, the storage section 120, and the like. The web information generation section 130 includes a dynamic generation section 132, and can dynamically generate the web information utilizing the function of the dynamic generation section 132. The dynamic generation section 132 is implemented using a known technology such as template matching software.

The hardware of the projector 100 for implementing the functions of the update request reception section 140 and the like is described below.

Figure 3:
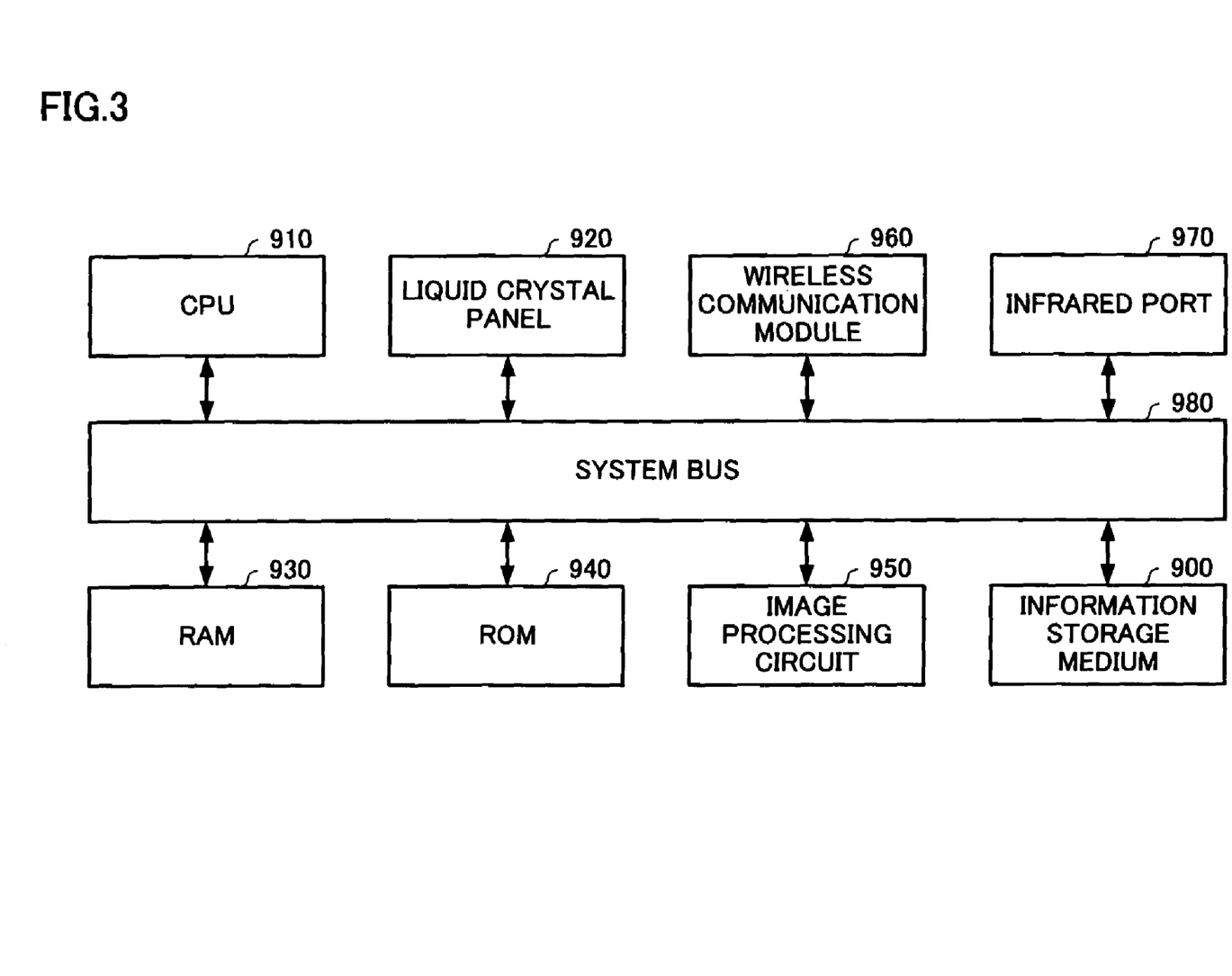
FIG. 3 is a hardware block diagram of a projector according to one embodiment of the invention.

FIG. 3 is a hardware block diagram of the projector 100 according to this embodiment.

For example, a wireless communication module 960, an infrared port 970, and the like may be used as the communication section 110. A CPU 910 and the like may be used as the web information generation section 130, the update request reception section 140, and the update section 150. A liquid crystal panel 920 and the like may be used as the projection section 190. An image processing circuit 950 and the like may be used as the image generation section 160. A RAM 930, a ROM 940, and the like may be used as the storage section 120. Each section such as the CPU 910 can exchange data via a system bus 980.

The projector 100 may read a program from an information storage medium 900 and execute the processes of the update request reception section 140 and the like based on the program. The projector 100 may read the layout data 123 and the authorization data 124 from the information storage medium 900.

A storage medium using a laser, magnetism, or the like may be applied as the information storage medium 900, such as a CD-ROM, DVD-ROM, IC card, ROM, RAM, memory card, or HDD. The program may be read from the information storage medium 900 using a contact method or a noncontact method.

Data

The initial projection target data 121, the updated projection target data 122, the layout data 123, the authorization data 124, and the update request data 125 are described below in detail.

Figure 4:
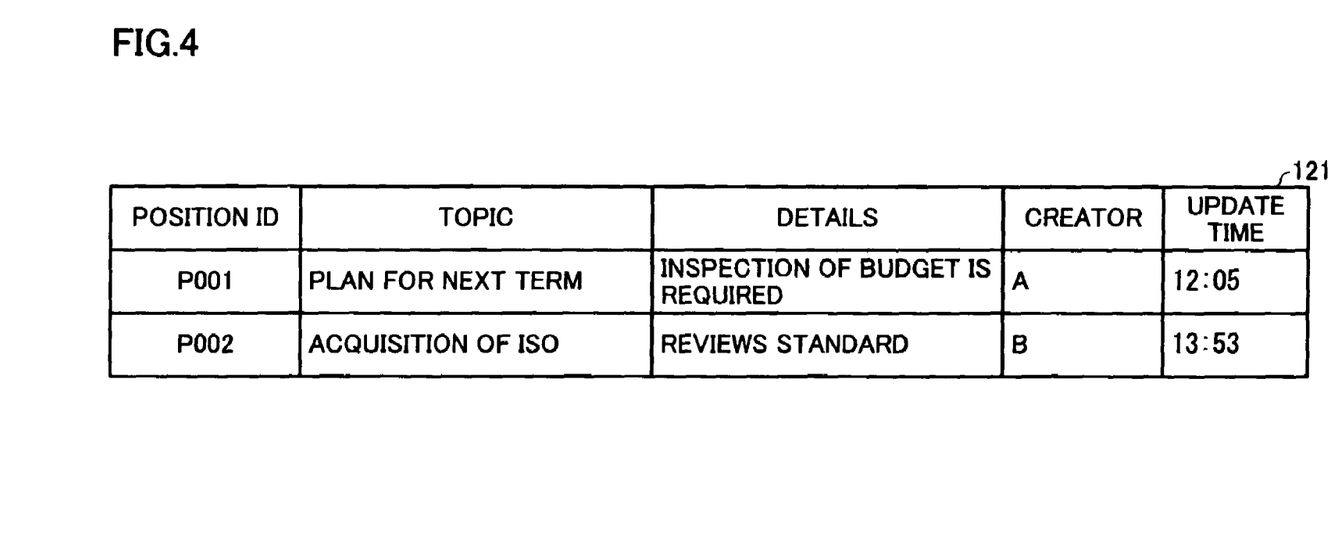
FIG. 4 is a table showing initial projection target data according to one embodiment of the invention.

FIG. 4 is a table showing the initial projection target data 121 according to this embodiment.

The initial projection target data 121 is the initial projection target data provided in subject units, for example. Examples of the items of the initial projection target data 121 include a position ID for identifying the display position, a topic, details, a creator, an update time which is one type of update date/time, and the like.

Examples of the update date/time also include an update date, a combination of an update date and an update time, and the like. Examples of the date/time also include a date, a combination of a date and a time, and the like. In this embodiment, the update time is used as the update date/time, and the time is used as the date/time for convenience of description.

Figure 5:
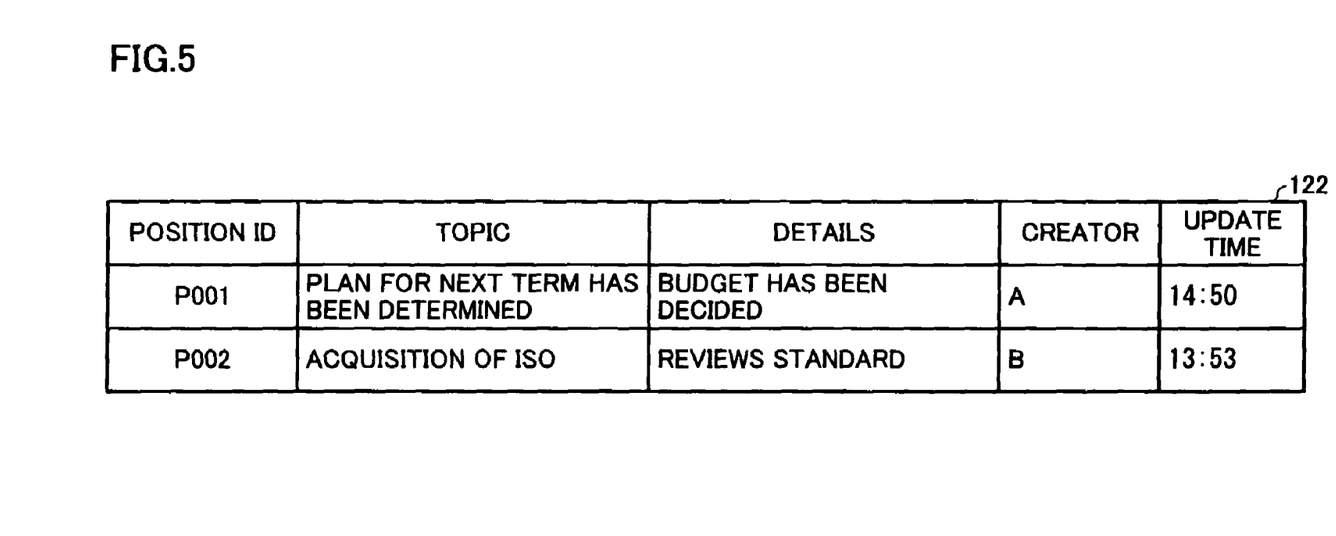
FIG. 5 is a table showing updated projection target data according to one embodiment of the invention.

FIG. 5 is a table showing the updated projection target data 122 according to this embodiment.

The updated projection target data 122 is the projection target data updated by the update section 150. Specifically, the initial projection target data 121 is the initial data which is not changed. On the other hand, the updated projection target data 122 is changed each time the updated projection target data 122 is updated by the update section 150.

Figure 6:
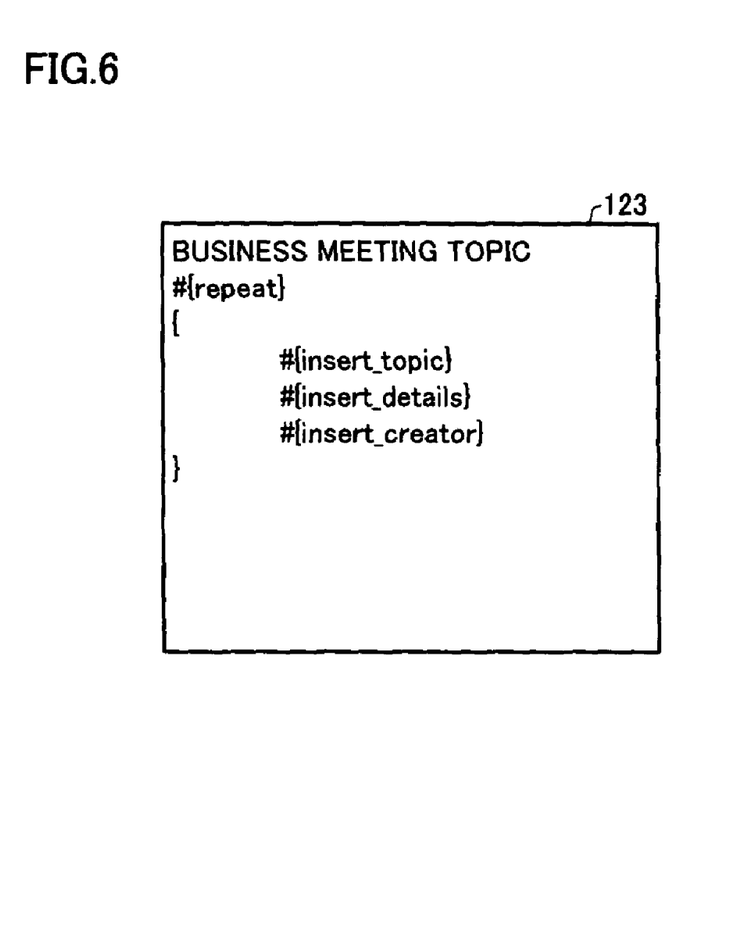
FIG. 6 is a table showing layout data according to one embodiment of the invention.

The layout data 123 is described below.

FIG. 6 is a table showing the layout data 123 according to this embodiment.

The layout data 123 shown in FIG. 6 indicates a business meeting topic as the subject, and #{repeat} indicates that the data in the parenthesis { } immediately after {repeat} is repeatedly displayed. #{insert_topic}, #{insert_details}, and #{insert_creator} are specified as the data in the parenthesis {}. #{insert_topic}, #{insert_details}, and #{insert_creator} respectively indicate displaying the topic, the details, and the creator of the initial projection target data 121 or the updated projection target data 122. The number of subjects in the layout data 123 is not limited to one. Two or more subjects may be specified. The layout data 123 may be defined based on a request from the dynamic generation section 132.

Figure 7:
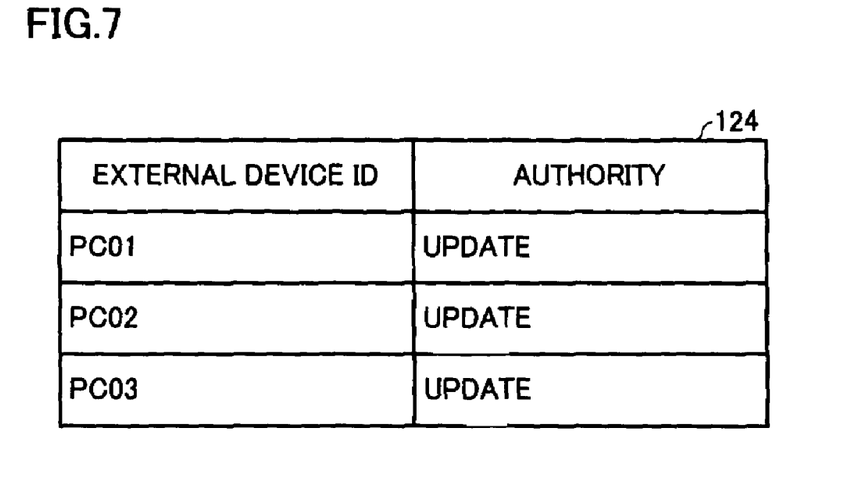
FIG. 7 is a table showing authorization data according to one embodiment of the invention.

The authorization data 124 is described below.

FIG. 7 is a table showing the authorization data 124 according to this embodiment.

The authorization data 124 is data indicating the authority of each PC 300 for the projection target data. Examples of the items of the authorization data 124 include an external device ID for identifying the PC 300, authority, and the like. Examples of the authority include "Update" indicating that the PC 300 can update and read data, "Read only" indicating that the PC 300 cannot update data but can read data, "Not available" indicating that the PC 300 cannot update and read data, "Administrator" indicating that the PC 300 can update data and set authority, and the like. The authority "Administrator" may be assigned to a chairperson of a meeting, for example.

Figure 8:
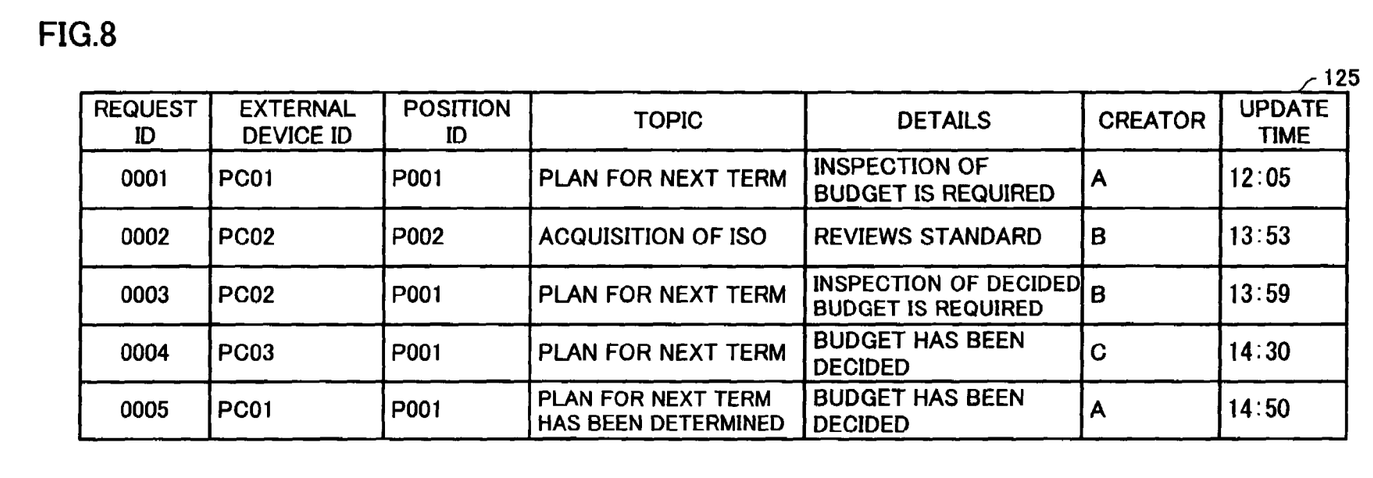
FIG. 8 is a table showing update request data according to one embodiment of the invention.

The update request data 125 is described below.

FIG. 8 is a table showing the update request data 125 according to this embodiment.

The update request data 125 is data indicating the details of the update request from the PC 300. Examples of the items of the update request data 125 include a request ID for identifying each update request, an external device ID for identifying the PC 300 which has issued the update request, a position ID for identifying the location of the update target data, a topic, details, a creator, an update time, and the like.

As shown in FIG. 8, the update request data 125 is sequentially stored and accumulated together with the update time and the like to function as historical data.

Image Display

The image display operations of the projector 100 and the PC 300 are described below. In this embodiment, the PCs 300-1 to 300-3 of respective users and the projector 100 can communicate via wireless communication. Each user changes data using the PC 300 while watching the image projected by the projector 100, or creates common document data while discussing the topic and the like relating to the subject.

An image display operation in the initial state is as follows. In the initial state, the update request data 125 is not stored in the storage section 120, and the updated projection target data 122 is the same as the initial projection target data 121. The initial projection target data 121, the layout data 123, and the authorization data 124 may be data transmitted from the PC 300 or the like and containing information, or may be data which contains only the items and does not contain information. The image generation section 160 generates an image based on the initial projection target data 121 and the layout data 123, and the projection section 190 projects the image onto a screen or the like.

The web information generation section 130 generates the web information using the dynamic generation section 132 based on the initial projection target data 121 and the layout data 123, and the communication section 110 transmits the web information to each PC 300. Each PC 300 displays a web page based on the web information using a browser.

Figure 9:
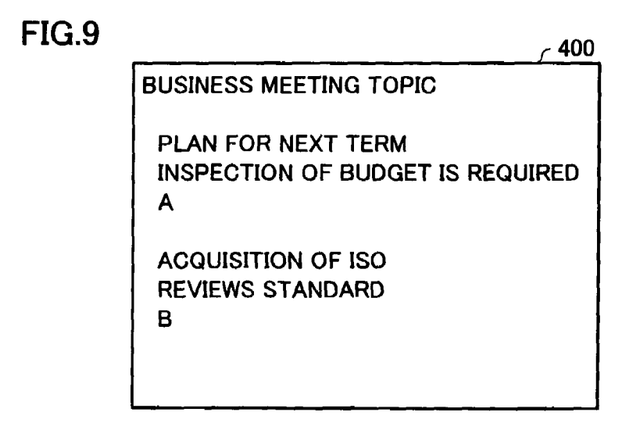
FIG. 9 is a table showing an example of a web page in an initial state according to one embodiment of the invention.

FIG. 9 is a table showing a web page 400 in the initial state according to this embodiment.

The dynamic generation section 132 inserts the data of the initial projection target data 121 in the variable portion (e.g. {insert_topic}) of the layout data 123, whereby an editable web page 400 is generated. In the initial state, the members of the meeting can also confirm the image on the PC 300 while watching the image projected by the projector 100.

An update operation when changing data is described below. For example, the user changes the web page 400 using the PC 300 in order to inform other users of his/her opinion, and performs a change operation (e.g. operation of pressing a specific key of a keyboard).

When the user has issued a change request for the web page 400 using the PC 300, the PC 300 transmits update request information to the projector 100. The update request information include the external device ID, the position ID, the topic, the details, and the creator contained in the update request data 125, for example. For example, the external device ID and the creator may be included in the update request information by storing the external device ID and the creator in advance in the browser software of the PC 300 as instrument identification information. The projector 100 may incorporate the position ID in the update request information received by incorporating the position ID in the web information transmitted.

When the communication section 110 has received the update request information, the update request reception section 140 adds the data to the update request data 125 based on the update request information without referring to the authorization data 124.

When the data has been added to the update request data 125, the update section 150 determines whether or not update authority is given to the external device ID in the added data referring to the authorization data 124. When the update section 150 has determined that update authority is given to the external device ID, the update section 150 updates the updated projection target data 122 based on the added data.

Specifically, the update section 150 searches for the record in the updated projection target data 122 which coincides with the position ID in the update request data 125, and updates the record which coincides with the position ID. The update section 150 updates the update time in the updated projection target data 122 during the update operation, and writes the update time into the record added to the update request data 125.

When the update section 150 has determined that update authority is not given to the external device ID in the data added to the update request data 125, the update section 150 deletes the data.

The web information generation section 130 and the image generation section 160 generate the web information and the like when the updated projection target data 122 has been updated or at specific time intervals (e.g. at intervals of 5 seconds or 10 seconds).

Figure 10:
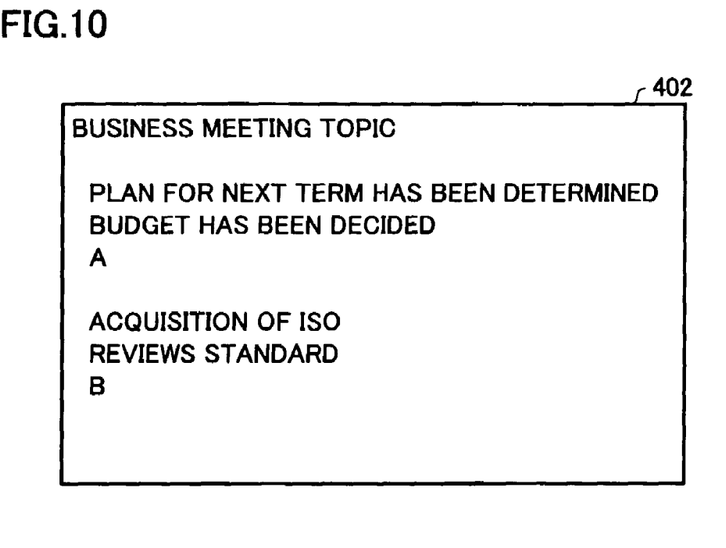
FIG. 10 is a table showing an example of an updated web page according to one embodiment of the invention.

FIG. 10 is a table showing an example of an updated web page 402 according to this embodiment.

For example, when the updated projection target data 122 is in a state shown in FIG. 5, the web page 402 shown in FIG. 10 is displayed. The projector 100 projects an image similar to the web page 402. Note that the image projected by the projector 100 cannot be edited.

As described above, the projector 100 can update the updated projection target data 122 depending on the authority. Since the projector 100 updates the updated projection target data 122 after sequentially writing the update request data 125 into the storage section 120, a wait time does not occur, differing from the case where the projector 100 updates the updated projection target data 122 while occupying the updated projection target data 122. Therefore, two or more users can simultaneously update the updated projection target data 122 stored in the projector 100, whereby the updated projection target data 122 can be updated more flexibly.

Moreover, each user can immediately confirm the information including the updated information by causing each PC 300 to display the web page showing the projection target data arranged in a desired format based on the layout data 123 and causing the projector 100 to project the image based on the projection target data, whereby a meeting or the like can be held more effectively.

Rollback

A data rollback implementation method according to this embodiment is described below. For example, the user of the PC 300 issues a rollback request when a meeting is on the wrong track in order to recover the data at a specific point in time.

For example, the user of the PC 300 may issue a rollback request designating the data recovery target date/time (time in this embodiment). The communication section 110 receives rollback request information from the PC 300. The update section 150 updates the updated projection target data 122 based on the rollback request information and the update request data 125.

For example, when the update request data 125 is in a state shown in FIG. 7 and a rollback request for recovering the state before 14:00 has been issued, the update section 150 updates the updated projection target data 122 using the initial projection target data 121 and the record in the update request data 125 of which the update time is before 14:00.

Figure 11:
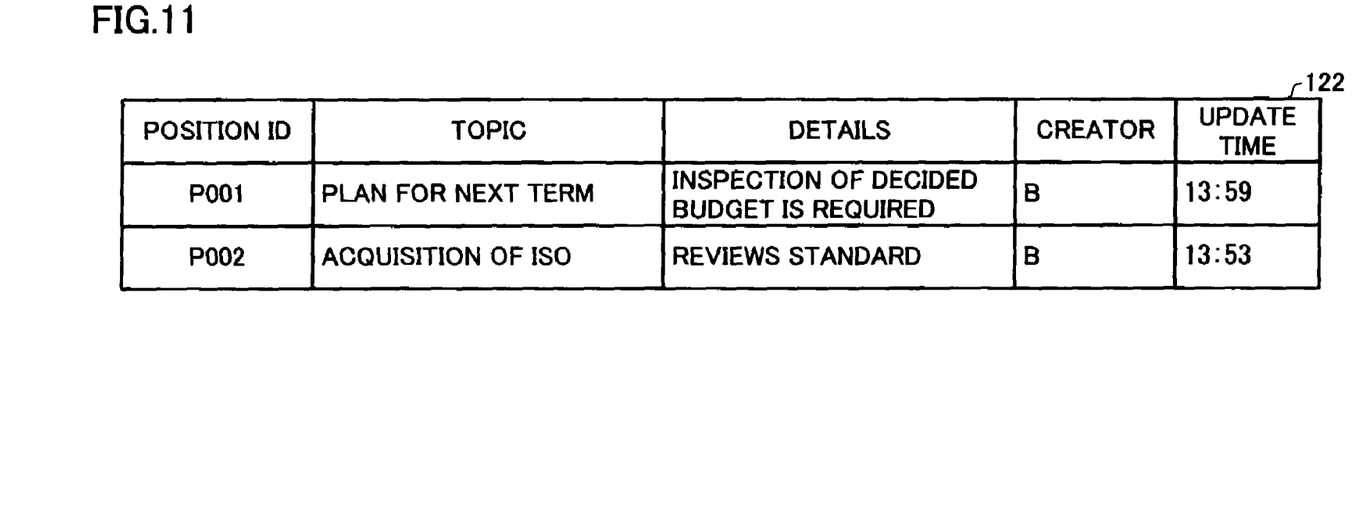
FIG. 11 is a table showing updated projection target data during a rollback according to one embodiment of the invention.
Figure 12:
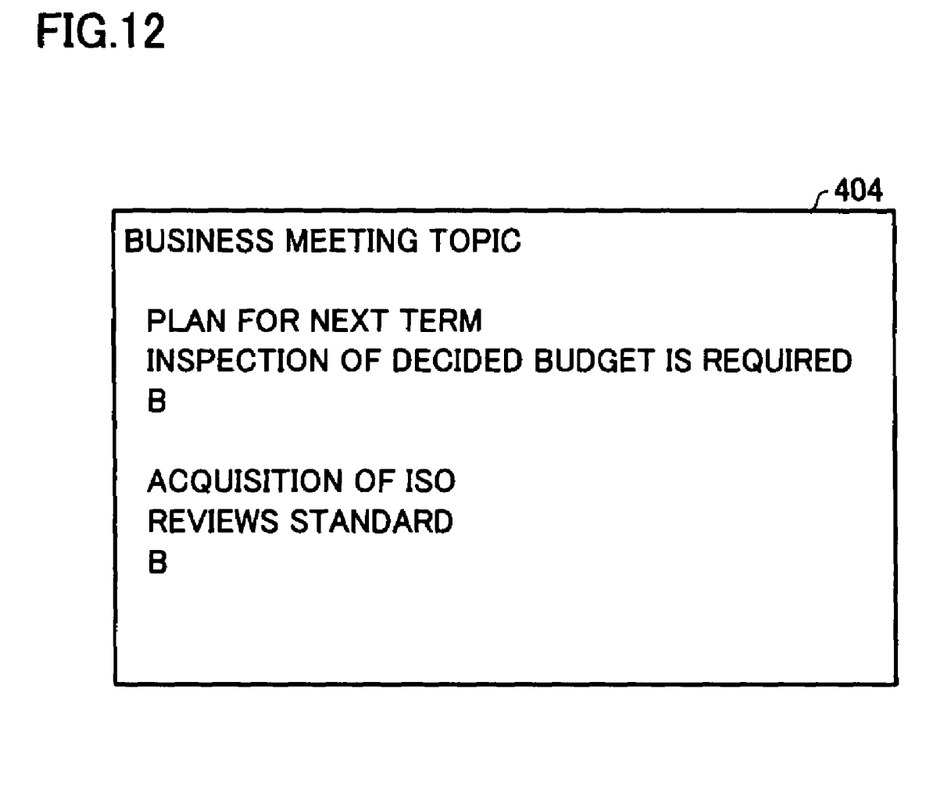
FIG. 12 is a table showing an example of a web page during a rollback according to one embodiment of the invention.

FIG. 11 is a table showing the updated projection target data 122 during a rollback according to this embodiment. FIG. 12 is a table showing an example of a web page 404 during a rollback according to this embodiment.

As described above, when a request (rollback request) for recovering the updated projection target data 122 at a specific point in time has been issued, the projector 100 can recover the updated projection target data 122 at the specified point in time in response to the request. Therefore, the projector 100 can more flexibly update the updated projection target data 122.

The update section 150 may update the updated projection target data 122 using the latest record with each position ID without using all records which fall within the specific time condition. This enables the projector 100 to more promptly recover the updated projection target data 122 at the specified point in time.

In general, when using a projector for a presentation or collaboration, the projector is directly connected with a dedicated PC. Therefore, it is difficult to hold a meeting using a PC of each user and the projector. Moreover, it is difficult to flexibly update data stored in the projector from the PC of each user. Therefore, the data is updated using the dedicated PC.

According to the above embodiment, the PC 300 of each user can more flexibly update the updated projection target data 122 by accessing the projector 100 and issuing the update request at the same time. Therefore, the convenience of the projector 100 as a network instrument is improved.

In particular, when using the projector 100 in a meeting or the like, a user who did not participate in the meeting can verify the discussion by tracking changes in the document, or the course of discussion can be appropriately controlled by appropriately setting the authority for the document to divide the updated projection target data 122 into a portion which can be edited by the chairperson and a portion which can be edited by the members of the meeting, or intelligence-intensive work can be achieved such as examining and putting together various opinions merely by operating the remote controller 310.

Other Embodiments

The invention is not limited to the above-described embodiments. Various modifications and variations may be made.

For example, the update section 150 may update the updated projection target data 122 in response to update instructions from the PC 300 or the remote controller 310 without using the authorization data 124.

Specifically, the image generation section 160 generates an image in a state in which the updated projection target data 122 has been updated, and the projection section 190 projects the image, for example. The user who operates the remote controller 310 determines whether or not to allow the update after confirming the image, and presses the operation button. This causes the remote controller 310 to transmit update availability information indicating whether or not to allow the update to the projector 100 via infrared communication. The communication section 110 receives the update availability information from the remote controller 310. The update section 150 may update the updated projection target data 122 based on the update availability information and the update request data 125 when the update availability information indicates that the user allows the update, and may not update the updated projection target data 122 when the update availability information indicates that the user does not allow the update.

This enables the projector 100 to determine whether or not to update the updated projection target data 122 based on the update availability information from the remote controller 310, whereby the projector 100 can more flexibly update the updated projection target data 122.

The authorization data 124 may be data indicating the authority for each item (e.g. topic, details, and the like).

In this case, the update section 150 may update the updated projection target data 122 based on the update request data 125 and the authorization data 124 when the PC 300 has update authority for the item in the updated projection target data 122 for which the update request has been issued, and may not update the updated projection target data 122 when the PC 300 does not have update authority for the item for which the update request has been issued.

This enables the projector 100 to determine whether or not to update the updated projection target data 122 based on the authority for each item in the updated projection target data 122, whereby the projector 100 can more flexibly update the updated projection target data 122.

The projector 100 and the PC 300 can display an image showing the update details of each creator using a mechanism similar to the above-described rollback.

Specifically, the PC 300 or the remote controller 310 transmits creator designation information which designates the creator or the PC 300 operated by the creator, and the communication section 110 receives the creator designation information. The creator designation information includes the identification information of the creator or the PC 300 operated by the creator. The update section 150 updates the updated projection target data 122 using the latest record with each position ID of which the update has been requested by the creator designated by the user from the update request data 125 or the PC 300 operated by the creator. The subsequent procedure is the same as the procedure according to the above embodiments. Therefore, description thereof is omitted.

As described above, the projector 100 and the PC 300 can display the image showing the update details of each creator or each PC 300, and the projector 100 can flexibly update the updated projection target data 122, whereby the user can effectively hold a meeting or the like.

At least one of the web information generation section 130 and the image generation section 160 may generate information indicating the minutes based on the update request data 125. Since the update request data 125 includes the update date/time, the creator, the update details, and the like, the projector 100 can easily generate the information indicating the minutes, whereby the user can more effectively hold a meeting or the like.

In the above embodiments, the initial projection target data 121 and the updated projection target data 122 are provided as the projection target data. Note that the projector 100 may use only the updated projection target data 122 as the projection target data when the rollback or the like is not performed.

The projector 100 is not limited to a liquid crystal projector. The projector 100 may be a projector using a digital micromirror device (DMD) developed by Texas Instruments Incorporated (USA), a CRT projector, a projector using organic EL, or the like.

The external device is not limited to the PC 300. The external device may include various instruments having a display function, an input function, and a communication function, such as portable telephones and personal digital assistants (PDA).

The storage section 120 is not limited to the RAM and the like provided in the projector 100. The function of the storage section 120 may be implemented using an information reading section such as a card reader and an external information storage medium such as a flash memory card.

The connection method for the projector 100 and the PC 300 is not limited to wireless communication. The projector 100 and the PC 300 may be connected via cable communication.

The invention may be applied to various cooperative works such as a presentation and a meeting. The invention is also effective when projecting part or the entirety of an image using two or more projectors 100.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A projector comprising:
a communication section which communicates with a plurality of external devices;
a storage section which stores projection target data including a plurality of records and layout data to arrange the projection target data in a web page form;
an update request reception section which receives an update request from the external devices via the communication section, and sequentially writes update request data indicating details of the update request into the storage section;
an update section which updates the projection target data based on the update request data;
a web information generation section which generates web information to display the projection target data in the web page form based on the projection target data and the layout data, and causes the communication section to transmit the web information to the external devices;
an image generation section which generates an image based on the projection target data; and
a projection section which projects the image,
wherein the update section searches for a record in the projection target data that coincides with a position ID in the update request data, and updates the record that coincides with the position ID.

2. The projector according to claim 1,
wherein the projection target data includes initial projection target data and updated projection target data indicating the projection target data updated by the update section;
wherein the update section writes information indicating an update time in the update request data when the update section updates the projection target data based on the update request; and
wherein, when the external devices or a remote controller for the projector has issued a rollback request specifying an update time, the update section generates the updated projection target data of the specified update time based on the update request data having an update time being the same or before the specified update time and the initial projection target data.

3. The projector according to claim 1,
wherein the projection target data includes initial projection target data and updated projection target data indicating the projection target data updated by the update section;
wherein the update request includes identification that identifies an external device in the external devices which has issued the update request or a user of the external device;
wherein the update request data includes the identification information; and wherein, when the external devices or a remote controller for the projector has issued a display request specifying the identification information, the update section generates the updated projection target data updated by the external device or a user of the external device corresponding to the specified identification information, based on the update request data having the identification information which coincides with the specified identification information and the initial projection target data.

4. The projector according to claim 1,
wherein the storage section stores authorization data indicating at least one of authority of each of the external devices for the projection target data and authority of each user of the external devices for the projection target data;
wherein the update request reception section writes at least one of identification information of the external devices which has issued the update request and identification information of a user of the external device into the storage section as part of the update request data; and
wherein the update section updates the projection target data based on the update request data and the authorization data when the external device or the user of the external device has update authority for the projection target data, and does not update the projection target data when the external device or the user of the external device does not have the update authority for the projection target data.

5. The projector according to claim 4,
wherein the projection target data includes a plurality of items; wherein the authorization data indicates the authority for each of the items; and
wherein the update section updates the projection target data based on the update request data and the authorization data when the external devices or a user of the external device has update authority for one of the items in the projection target data for which the update request has been issued, and does not update the projection target data when the external device or the user of the external device does not have the update authority for one of the items in the projection target data for which the update request has been issued.

6. The projector according to claim 1,
wherein the communication section receives update availability information from a remote controller; and
wherein the update section updates the projection target data based on the update availability information and the update request data when the update availability information indicates that the update is allowed, and does not update the projection target data when the update availability information indicates that the update is not allowed.

7. A non-transitory storage medium storing a computer-executable program readable by a computer included in a projector having a communication section which communicates with a plurality of external devices, a storage section, and a projection section, the program comprising:
an instruction that causes the storage section to store projection target data including a plurality of records and layout data to arrange the projection target data in a web page form;
an instruction that causes the computer to receive an update request from the external devices via the communication section, and sequentially write update request data indicating details of the update request into the storage section;
an instruction that causes the computer to update the projection target data based on the update request data, the computer searching for a record in the projection target data that coincides with a position ID in the update request data and updating the record that coincides with the position ID;
an instruction that causes the computer to generate web information to display the projection target data in the web page form based on the projection target data and the layout data, and cause the communication section to transmit the web information to the external devices;
an instruction that causes the computer to generate an image based on the projection target data; and
an instruction that causes the projection section to project the image.

8. A method for controlling a projector having a communication section which communicates with a plurality of external devices, and a storage section which stores projection target data including a plurality of records and layout data to arrange the projection target data in a web page form, the method comprising steps of:
receiving an update request from the external devices via the communication section;
sequentially writing update request data indicating details of the update request into the storage section;
searching for a record in the projection target data that coincides with a position ID in the update request data;
updating the record that coincides with the position ID;
generating web information to display the projection target data in the web page form based on the projection target data and the layout data;
transmitting the web information to the external devices from the communication section; and
generating and projecting an image based on the projection target data.

9. A computer program product having a computer-executable program and a non-transitory tangible storage medium storing the computer-executable program readable by a computer included in a projector having a communication section which communicates with a plurality of external devices, a storage section, and a projection section, the program comprising:
an instruction that causes the storage section to store projection target data including a plurality of records and layout data to arrange the projection target data in a web page form;
an instruction that causes the computer to receive an update request from the external devices via the communication section, and sequentially write update request data indicating details of the update request into the storage section;

an instruction that causes the computer to update the projection target data based on the update request data, the computer searching for a record in the projection target data that coincides with a position ID in the update request data and updating the record that coincides with the position ID;

an instruction that causes the computer to generate web information to display the projection target data in the web page form based on the projection target data and the layout data, and cause the communication section to transmit the web information to the external devices;

an instruction that causes the computer to generate an image based on the projection target data; and an instruction that causes the projection section to project the image.

* * * * *